(12) United States Patent
Sanai et al.

(10) Patent No.: US 10,442,472 B2
(45) Date of Patent: Oct. 15, 2019

(54) VEHICLE FLOOR PANEL

(71) Applicants: Suzuki Motor Corporation, Hamamatsu-shi, Shizuoka (JP); Toyota Jidosha Kabushiki Kaisha, Toyota-shi, Aichi (JP); TORAY INDUSTRIES, INC., Chuo-ku, Tokyo (JP); Honda Motor Co., Ltd., Minato-ku, Tokyo (JP); Mitsubishi Motors Corporation, Minato-ku, Tokyo (JP); Subaru Corporation, Shibuya-ku, Tokyo (JP); Dome Co., Ltd., Maibara-shi, Shiga (JP)

(72) Inventors: Shusuke Sanai, Hamamatsu (JP); Tomomi Ichida, Hamamatsu (JP); Kanji Takaoka, Toyota (JP); Yukitane Kimoto, Nagoya (JP); Tomoya Yabu, Wako (JP); Yoshinori Yamamori, Tokyo (JP); Hideaki Maeda, Sunto-gun (JP); Tsubasa Ono, Tokyo (JP); Hiroshi Yuchi, Maibara (JP); Yasuhiro Kira, Maibara (JP); Kazuaki Amaoka, Nagoya (JP)

(73) Assignees: Suzuki Motor Corporation (JP); Toyota Jidosha Kabushiki Kaisha (JP); TORAY INDUSTRIES, INC. (JP); Honda Motor Co., Ltd. (JP); Mitsubishi Motors Corporation (JP); Subaru Corporation (JP); Dome Co., Ltd. (JP)

(*) Notice: Subject to any disclaimer, the term of this patent is extended or adjusted under 35 U.S.C. 154(b) by 0 days.

(21) Appl. No.: 15/762,359

(22) PCT Filed: Sep. 23, 2016

(86) PCT No.: PCT/JP2016/078029
§ 371 (c)(1),
(2) Date: Mar. 22, 2018

(87) PCT Pub. No.: WO2017/051873
PCT Pub. Date: Mar. 30, 2017

(65) Prior Publication Data
US 2018/0273114 A1    Sep. 27, 2018

(30) Foreign Application Priority Data

Sep. 25, 2015 (JP) ................. 2015-188634

(51) Int. Cl.
*B62D 25/20* (2006.01)
*B62D 29/04* (2006.01)

(52) U.S. Cl.
CPC ............. *B62D 25/20* (2013.01); *B62D 29/04* (2013.01)

(58) Field of Classification Search
CPC ............................ B62D 25/20; B62D 29/04
(Continued)

(56) References Cited

U.S. PATENT DOCUMENTS

| 6,048,022 A | 4/2000 | Ishibashi et al. |
| 6,170,905 B1 | 1/2001 | Jurica |

(Continued)

FOREIGN PATENT DOCUMENTS

| DE | 202008008440 U1 | 10/2008 |
| DE | 102011050652 A1 | 11/2012 |

(Continued)

OTHER PUBLICATIONS

International Search Report for Application No. PCT/JP2016/078029 dated Dec. 12, 2016.
(Continued)

*Primary Examiner* — Pinel E Romain
(74) *Attorney, Agent, or Firm* — Lerner, David, Littenberg, Krumholz & Mentlik, LLP

(57) ABSTRACT

To provide a vehicle floor panel having a certain rigidity and being less prone to deformation during manufacturing and
(Continued)

deformation when the vehicle floor panel installed in a vehicle is subjected to loads in various directions from outside the vehicle. A vehicle floor panel includes a floor panel main body made of a fiber-reinforced resin, a plurality of recesses 23-1 to 23-7 protruding on one of a lower surface 22 and upper surface of the floor panel main body and depressed on the other of the surfaces and arranged by being spaced apart from one another, and ribs 24-1 to 24-12 connecting two adjacent ones of the recesses on the one of the surfaces of the floor panel main body.

9 Claims, 4 Drawing Sheets

(58) Field of Classification Search
USPC .................................................. 296/193.07
See application file for complete search history.

(56) References Cited

U.S. PATENT DOCUMENTS

| | | | | |
|---|---|---|---|---|
| 7,784,854 B2* | 8/2010 | Breidenbach | ........ | B62D 35/001 |
| | | | | 296/180.1 |
| 7,784,856 B2* | 8/2010 | Fuchs | ....................... | B32B 5/26 |
| | | | | 296/184.1 |
| 2009/0008511 A1 | 1/2009 | Wippler et al. | | |
| 2011/0005165 A1* | 1/2011 | Stadthagen-Gonzalez | .................. | |
| | | | | E04C 2/326 |
| | | | | 52/783.1 |
| 2012/0068496 A1 | 3/2012 | Ellis et al. | | |
| 2013/0313863 A1 | 11/2013 | Yamaji et al. | | |
| 2014/0021747 A1* | 1/2014 | Goettker | ................. | B29C 70/48 |
| | | | | 296/203.01 |

FOREIGN PATENT DOCUMENTS

| | | |
|---|---|---|
| EP | 2431259 A1 | 3/2012 |
| EP | 2671780 A1 | 12/2013 |
| JP | H10129529 A | 5/1998 |
| JP | 2000034820 A | 2/2000 |
| JP | 2000512239 | 9/2000 |
| JP | 2002048178 A | 2/2002 |
| JP | 2010023326 A | 2/2010 |
| JP | 2010247680 A | 11/2010 |
| JP | 2012017047 | 1/2012 |
| JP | 2012056573 A | 3/2012 |
| JP | 2014211640 A | 11/2014 |
| JP | 2015013538 A | 1/2015 |

OTHER PUBLICATIONS

Extended European Search Report including Written Opinion for EP16848661 dated Sep. 17, 2018.
Japanese Office Action for Application No. 2015-188634 dated Jul. 26, 2019, 5 pages.

* cited by examiner

VEHICLE FLOOR PANEL

CROSS-REFERENCE TO RELATED APPLICATIONS

The present application is a national phase entry under 35 U.S.C. § 371 of International Application No. PCT/JP2016/078029 filed Sep. 23, 2016, published in Japanese, which claims priority from Japanese Patent Application No. 2015-188634, filed Sep. 25, 2015, all of which are hereby incorporated herein by reference.

TECHNICAL FIELD

The present invention relates to a vehicle floor panel.

BACKGROUND ART

Patent Literature 1 describes a plate-like body made of a synthetic resin, such as an automobile undercover, on which plural projections are formed.

CITATION LIST

Patent Literature

Patent Literature 1: JP 2010-023326 A

SUMMARY OF INVENTION

Technical Problem

When a fiber-reinforced resin containing fiber such as glass fiber or carbon fiber is used as a material of the plate-like body, thermal characteristics such as thermal diffusivity and a heat transfer coefficient may vary with the position in a forming die used to form the plate-like body. Consequently, there is fear that deformation such as warping might occur in forming the plate-like body by cooling the resin in the forming die.

Also, examples of the plate-like body include a floor panel making up a floor portion of a vehicle. When the vehicle collides or the like, great forces may be exerted on the floor panel from various directions. It is necessary to design the floor panel so as not to deform even in such cases.

The present invention has been made in view of the above circumstances, and has an object to provide a vehicle floor panel having a certain rigidity and being less prone to deformation during manufacture and deformation when the vehicle floor panel installed in a vehicle is subjected to loads in various directions from outside the vehicle.

Solution to Problem

To achieve the above object, the present invention provides a vehicle floor panel comprising: a floor panel main body made of a fiber-reinforced resin; a plurality of recesses protruding on one of a lower surface and an upper surface of the floor panel main body and depressed on the other of the surfaces, and arranged by being spaced away from one another; and a rib connecting two adjacent ones of the recesses on the one of the surfaces of the floor panel main body.

In one aspect of the vehicle floor panel, the rib is provided in parallel to a straight line linking a center of one of the two adjacent recesses to a center of the other.

In one aspect of the vehicle floor panel, a plurality of the ribs are provided in parallel to the straight line.

In one aspect of the vehicle floor panel, a height of the rib is less than a depth of the recesses.

In one aspect of the vehicle floor panel, the recesses are circular in planar view and arc-shaped in longitudinal section.

In one aspect of the vehicle floor panel, a plurality of unit recess groups are arranged on the floor panel main body along at least one of a vehicle front-rear direction and a vehicle width direction, where each of the unit recess groups is made up of one recess and six recesses provided adjacent to the recess and surrounding the recess.

In one aspect of the vehicle floor panel, the six recesses are arranged at predetermined intervals along a circumferential direction.

In one aspect of the vehicle floor panel, the fiber-reinforced resin is a discontinuous fiber-reinforced resin.

In one aspect, the vehicle floor panel further comprises a peripheral wall portion erected upward from an outer edge of the vehicle floor panel main body, wherein the recesses are provided by being spaced away from the peripheral wall portion.

Advantageous Effects of Invention

As described above, according to the present invention, the vehicle floor panel comprises a floor panel main body made of a fiber-reinforced resin; a plurality of recesses protruding on one of a lower surface and an upper surface of the floor panel main body and depressed on the other of the surfaces, and arranged by being spaced away from one another; and a rib connecting two adjacent ones of the recesses on the one of the surfaces of the floor panel main body.

This makes it possible to increase rigidity compared to a floor panel equal in plate thickness and not provided with recesses or a rib. This in turn makes it possible to inhibit deformation during manufacture and deformation when the vehicle floor panel installed in a vehicle is subjected to loads in various directions from outside the vehicle.

Also, to provide a floor panel main body having the recesses and rib with a rigidity nearly equal to that of a floor panel main body not provided with recesses or a rib, the plate thickness of the former floor panel main body can be reduced compared to that of the floor panel main body not provided with recesses or a rib. That is, installation of the recesses and rib makes it possible to reduce weight.

As described above, in one aspect of the vehicle floor panel, the rib is provided in parallel to a straight line linking a center of one of the two adjacent recesses to a center of the other. Consequently, forces exerted on the floor panel in case of a collision or the like can be distributed efficiently to the two recesses.

As described above, in one aspect of the vehicle floor panel, a plurality of the ribs are provided in parallel to the straight line. Consequently, forces exerted on the floor panel main body can be distributed more efficiently via the plurality of ribs.

As described above, in one aspect of the vehicle floor panel, a height of the rib is less than a depth of the recesses. This makes it possible to improve rigidity while suppressing weight of the rib and thus weight of the floor panel main body.

As described above, in one aspect of the vehicle floor panel, the recesses are circular in planar view and arc-shaped in longitudinal section. This makes it possible to inhibit concentration of forces on a specific part of each recess.

As described above, in one aspect of the vehicle floor panel, a plurality of unit recess groups are arranged on the floor panel main body along at least one of a vehicle front-rear direction and a vehicle width direction, where each of the unit recess groups is made up of one recess and six recesses provided adjacent to the recess and surrounding the recess. This makes it possible to improve rigidity of the entire floor panel and further inhibit deformation of the floor panel caused by loads from outside the vehicle.

As described above, in one aspect of the vehicle floor panel, the six recesses are arranged at predetermined intervals along a circumferential direction. Consequently, a planar portion between one (first recess) of the six recesses and a second recess adjacent to the first recess in one circumferential direction, a planar portion between the second recess and the surrounded recess, a planar portion between a third recess adjacent to the second recess in the same direction and the surrounded recess, and a planar portion between the third recess and a fourth recess adjacent to the third recess in the same direction are arranged in a zigzag pattern in planar view. This makes it possible to inhibit stress concentration on specific areas of the planar portions.

As described above, in one aspect of the vehicle floor panel, the fiber-reinforced resin is a discontinuous fiber-reinforced resin. Consequently, the floor panel can take advantage of the nature of the discontinuous fiber-reinforced resin, of which strength and weakness of mechanical properties does not have an orientation.

As described above, one aspect of the vehicle floor panel further comprises a peripheral wall portion erected upward from an outer edge of the vehicle floor panel main body, wherein the recesses are provided by being spaced away from the peripheral wall portion. Consequently, even if great forces are exerted on the peripheral wall portion, breakage of the peripheral wall portion starting from a recess can be inhibited.

DESCRIPTION OF EMBODIMENTS

Figure 1:
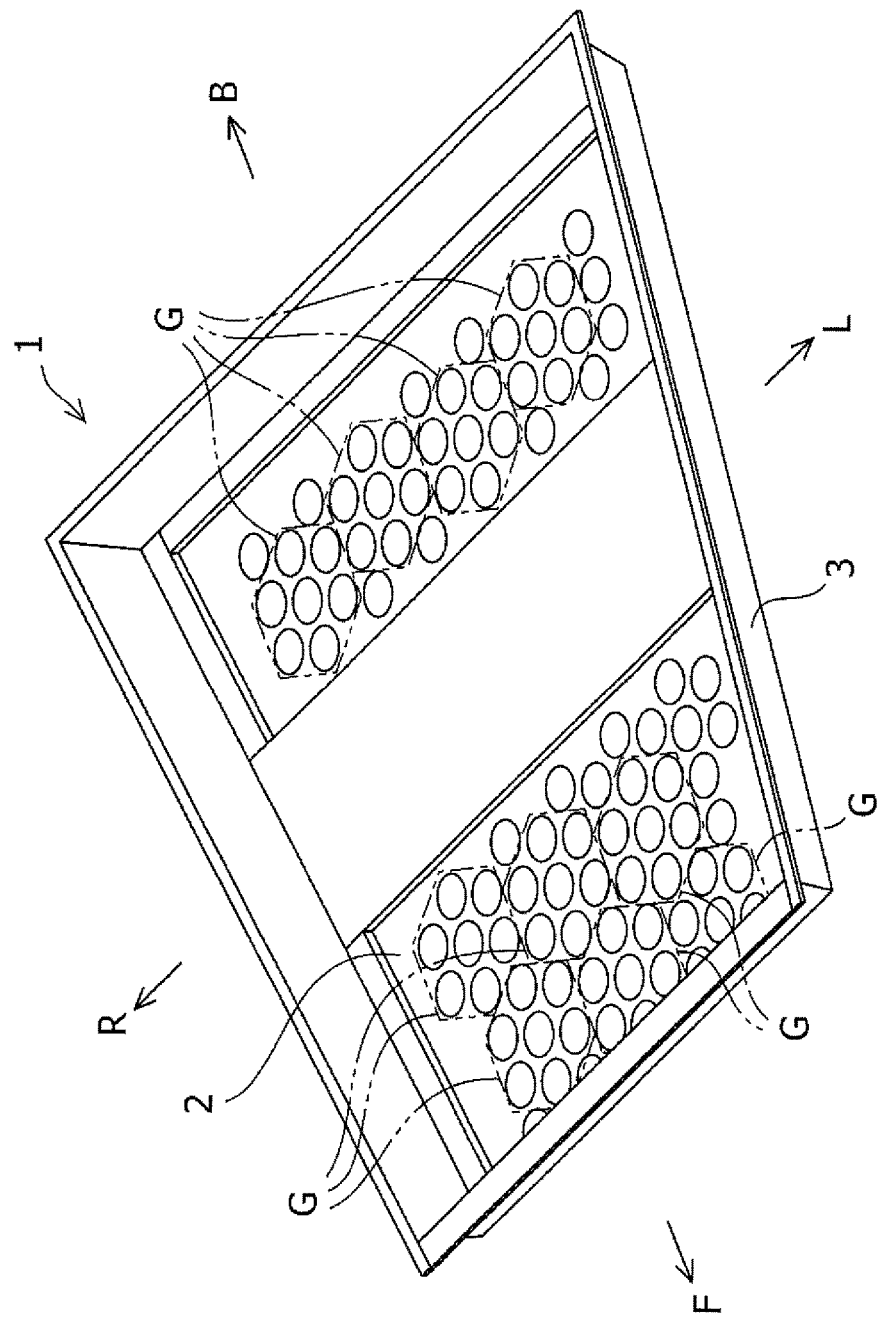
FIG. 1 is a perspective view of a vehicle floor panel.
Figure 2:
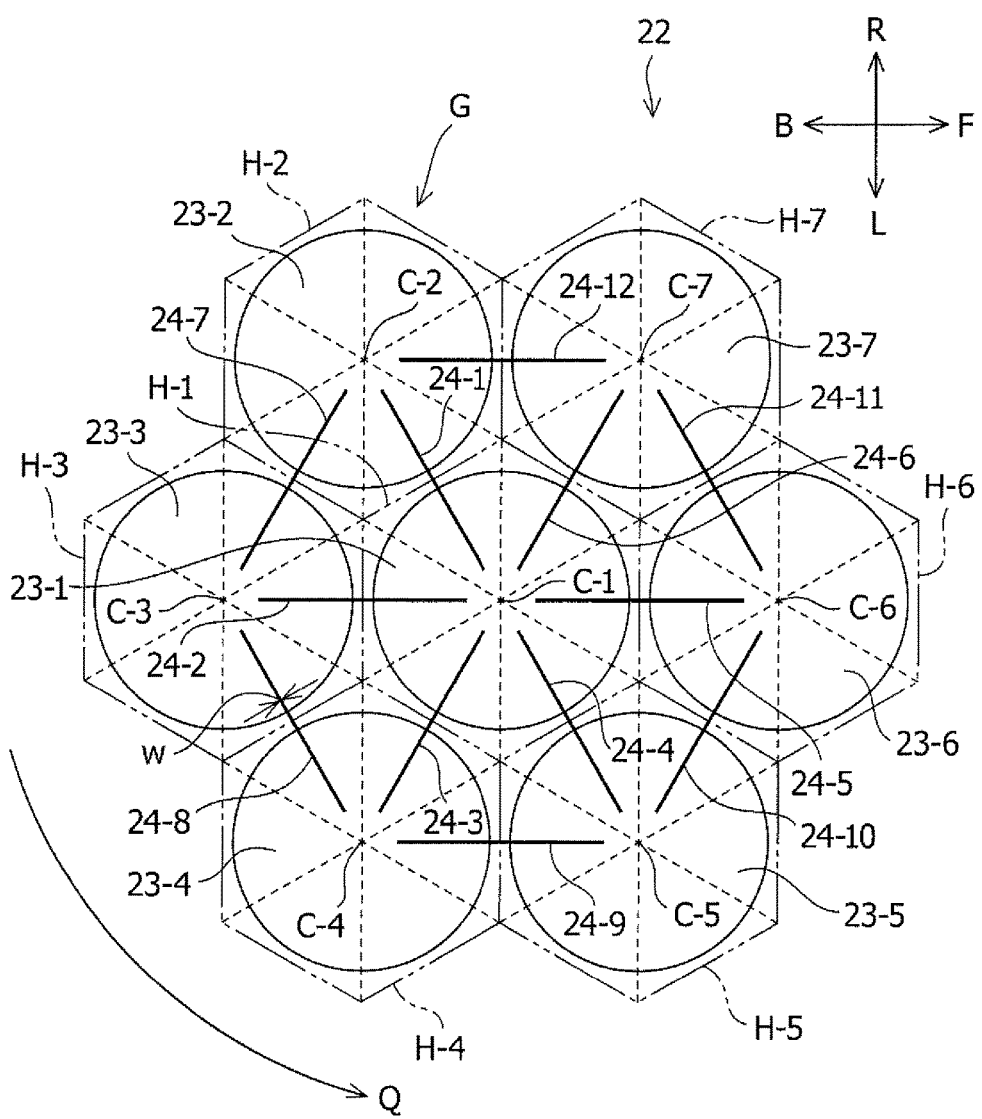
FIG. 2 is a partial bottom view of the vehicle floor panel.
Figure 3:
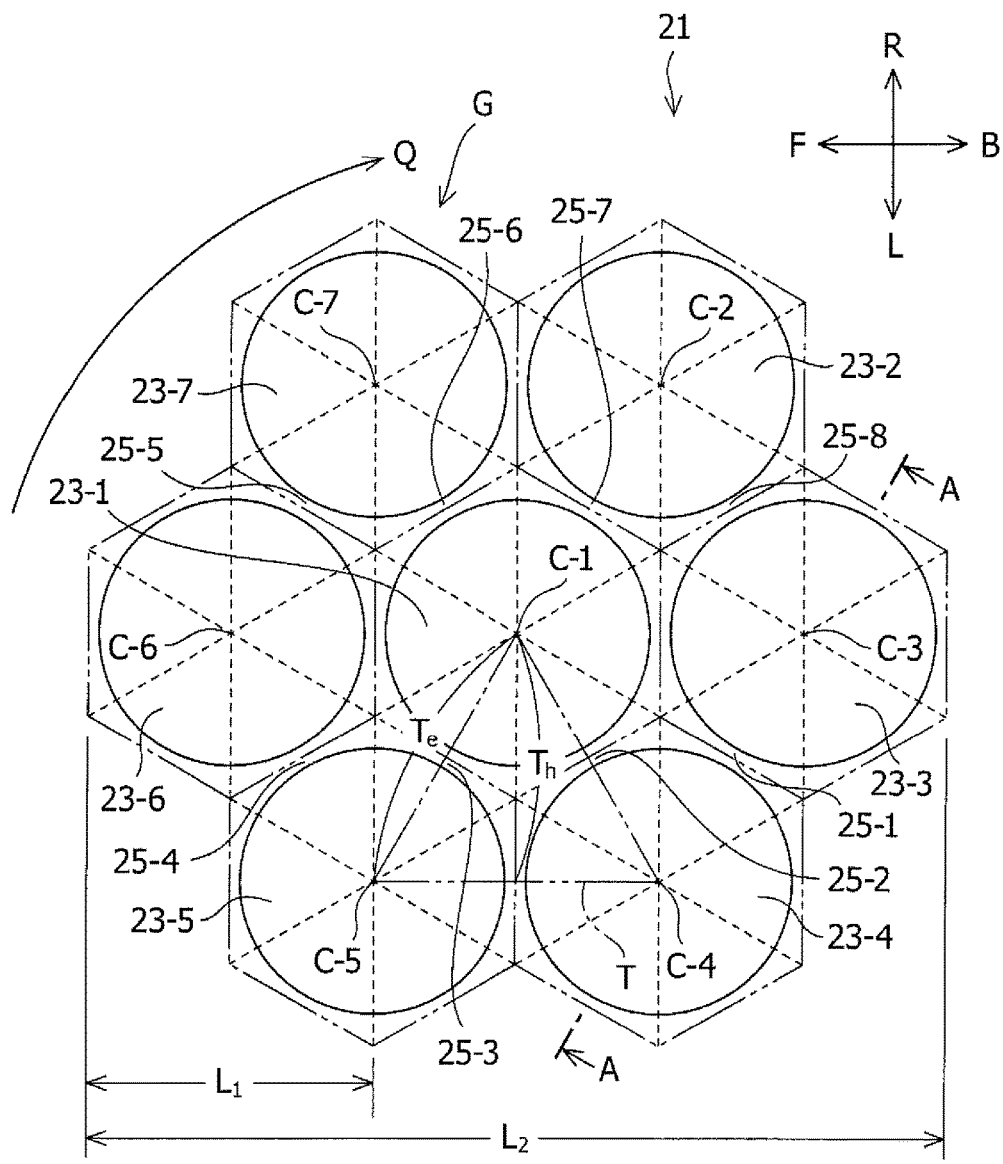
FIG. 3 is a partial plan view of the vehicle floor panel.
Figure 4:
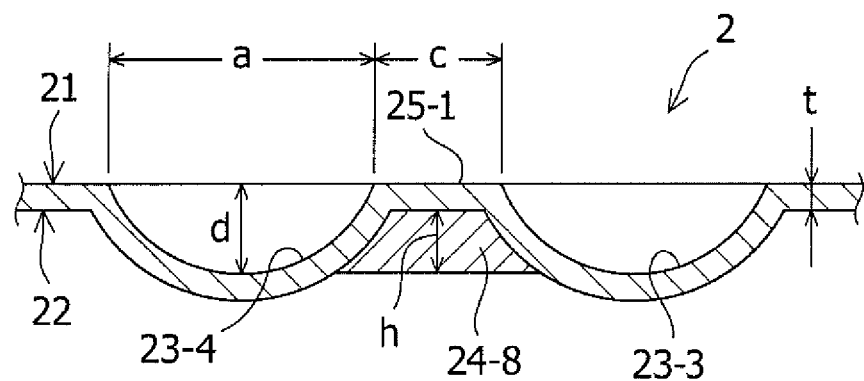
FIG. 4 is a sectional view taken along line A-A in FIG. 3.

The present invention will be described below with reference to illustrated embodiments. However, the present invention is not limited to the embodiments described below. Also, in the drawings, with a vehicle floor panel installed in a vehicle, arrow F indicates a forward direction in a vehicle front-rear direction, arrow B indicates a rearward direction in the vehicle front-rear direction, arrow L indicates a left direction in a vehicle width direction, and arrow R indicates a right direction in the vehicle width direction.

First Embodiment

As shown in FIGS. 1 to 4, a vehicle floor panel 1 includes a floor panel main body 2 shaped as a plate and made of a fiber-reinforced resin. The floor panel main body 2 has an upper surface 21 and a lower surface 22. Also, a plate thickness of the floor panel main body 2 is denoted by reference character "t".

On the floor panel main body 2, plural unit recess groups G each made up of plural recesses protruding on the lower surface 22 and depressed on the upper surface 21 are arranged along at least one of the vehicle front-rear direction and vehicle width direction. Each of the unit recess groups G is made up of a first recess 23-1, and a second recess 23-2 to a seventh recess 23-7 provided adjacent to the first recess 23-1 and surrounding the first recess 23-1. The seven recesses are arranged spaced apart from one another. Furthermore, the second recess 23-2 to the seventh recess 23-7 are arranged at predetermined intervals along a circumferential direction.

Specifically, the third recess 23-3 is located adjacent to the second recess 23-2 in one circumferential direction Q, the fourth recess 23-4 is located adjacent to the third recess 23-3 in the direction Q, and the fifth recess 23-5 is located adjacent to the fourth recess 23-4 in the direction Q. Furthermore, the sixth recess 23-6 is located adjacent to the fifth recess 23-5 in the direction Q, the seventh recess 23-7 is located adjacent to the sixth recess 23-6 in the direction Q, and the second recess 23-2 is located adjacent to the seventh recess 23-7 in the direction Q.

All the seven recesses in the unit recess group G are circular in planar view and arc-shaped in longitudinal section. A diameter of a planar circle formed by an edge portion of each of the recesses is equal among all the recesses and is denoted by reference character "a". Also, a depth of each of the recesses is equal among all the recesses and is denoted by reference character "d". Furthermore, an edge-to-edge distance between two adjacent recesses is equal among all the two adjacent recesses and is denoted by reference character The planar circle formed by the edge portion of the first recess 23-1 is surrounded by a first regular hexagon H-1 having a same center C-1 as the circle. Also, the planar circle formed by the edge portion of the second recess 23-2 is surrounded by a second regular hexagon H-2 having a same center C-2 as the circle. Similarly, the planar circles formed by the edge portions of the third recess 23-3 to the seventh recess 23-7 are surrounded by a third regular hexagon H-3 to a seventh regular hexagon H-7, respectively. The third regular hexagon H-3 to the seventh regular hexagon H-7 have respective centers C-3 to C-7.

The first regular hexagon H-1 to the seventh regular hexagon H-7 are congruent with one another. Each of the first regular hexagon H-1 to the seventh regular hexagon H-7 is arranged such that a straight line linking a pair of two opposing vertices with each other will be parallel to the vehicle width direction. In addition, the first regular hexagon H-1 is in contact with each of the second regular hexagon H-2 to the seventh regular hexagon H-7. Also, the second regular hexagon H-2 and third regular hexagon H-3 are in contact with each other, the third regular hexagon H-3 and fourth regular hexagon H-4 are in contact with each other, and the fourth regular hexagon H-4 and fifth regular hexagon H-5 are in contact with each other. Furthermore, the fifth regular hexagon H-5 and sixth regular hexagon H-6 are in contact with each other, the sixth regular hexagon H-6 and seventh regular hexagon H-7 are in contact with each other, and the seventh regular hexagon H-7 and second regular hexagon H-2 are in contact with each other. In this way, the first regular hexagon H-1 to the seventh regular hexagon H-7 make up a honeycomb structure.

Ribs connecting respective pairs of two adjacent recesses 23 in the unit recess group G are formed on the lower surface 22 of the floor panel main body 2. Specifically, a first rib 24-1 connecting the first recess 23-1 to the second recess 23-2, a second rib 24-2 connecting the first recess 23-1 to the third recess 23-3, and a third rib 24-3 connecting the first recess 23-1 to the fourth recess 23-4 are formed. Also, a fourth rib 24-4 connecting the first recess 23-1 to the fifth recess 23-5, a fifth rib 24-5 connecting the first recess 23-1 to the sixth recess 23-6, and a sixth rib 24-6 connecting the first recess 23-1 to the seventh recess 23-7 are formed.

In addition, a seventh rib 24-7 connecting the second recess 23-2 to the third recess 23-3, an eighth rib 24-8 connecting the third recess 23-3 to the fourth recess 23-4, and a ninth rib 24-9 connecting the fourth recess 23-4 to the fifth recess 23-5 are formed. Also, a tenth rib 24-10 connecting the fifth recess 23-5 to the sixth recess 23-6, an eleventh rib 24-11 connecting the sixth recess 23-6 to the seventh recess 23-7, and a twelfth rib 24-12 connecting the seventh recess 23-7 to the second recess 23-2 are formed.

Each rib is provided in parallel to a straight line linking a center of the planar circle formed by the edge portion of one of two recesses connected by the rib to a center of the planar circle formed by the edge portion of the other recess. Note that the center of the planar circle formed by the edge portion of a given recess is also referred to as the center of the given recess.

A height of each of the ribs in a vertical direction of the floor panel is equal among all the ribs and is denoted by reference character "h". The height "h" of the rib is less than the depth "d" of the recess. Also, a width of each of the ribs in a horizontal direction of the floor panel, i.e., a rib thickness, is equal among all the ribs and is denoted by reference character "w". The thickness "w" of the rib is less than the plate thickness "t" of the floor panel main body.

As described above, the second recess 23-2 to the seventh recess 23-7 are provided adjacent to the first recess 23-1 by surrounding the first recess 23-1 and arranged at predetermined intervals along a circumferential direction. A resulting arrangement of the planar portion existing between each pair of two adjacent recesses will be described below.

A first planar portion 25-1 exists between the third recess 23-3 and fourth recess 23-4, and a second planar portion 25-2 exists between the fourth recess 23-4 and first recess 23-1. Also, a third planar portion 25-3 exists between the fifth recess 23-5 and first recess 23-1, and a fourth planar portion 25-4 exists between the fifth recess 23-5 and sixth recess 23-6. In addition, the first planar portion 25-1, second planar portion 25-2, third planar portion 25-3, and fourth planar portion 25-4 are arranged in a zigzag pattern in planar view.

Also, a fifth planar portion 25-5 exists between the sixth recess 23-6 and seventh recess 23-7, and a sixth planar portion 25-6 exists between the seventh recess 23-7 and first recess 23-1. Also, a seventh planar portion 25-7 exists between the second recess 23-2 and first recess 23-1, and an eighth planar portion 25-8 exists between the second recess 23-2 and third recess 23-3. In addition, the fifth planar portion 25-5, sixth planar portion 25-6, seventh planar portion 25-7, and eighth planar portion 25-8 are arranged in a zigzag pattern in planar view.

In this way, plural planar portions are arranged in a zigzag pattern in planar view. A relationship between the diameter "a" of the recess and edge-to-edge distance "c" will be described below. First, consider an equilateral triangle formed by three centers, in total, of three adjacent recesses. In an equilateral triangle "T" whose vertices are located at the center C-1 of the first recess, the center C-4 of the fourth recess, and the center C-5 of the fifth recess, a length $T_e$ of each side and a height $T_h$ are expressed as follows:

[Expression 1]

$$T_e = a + c$$
$$T_h = \frac{\sqrt{3}}{2}T_e = \frac{\sqrt{3}}{2}(a+c)$$

Then, the following condition is set for the height $T_h$ of the equilateral triangle T.

[Expression 2]

$$T_h = \frac{\sqrt{3}}{2}(a+c) < a \Rightarrow c < \frac{2\sqrt{3}-3}{3}a \qquad (1)$$

That is, the height $T_h$ of the equilateral triangle is set to be less than the diameter "a" of the recess. In this way, when the relationship between the diameter "a" of the recess and edge-to-edge distance "c" is established, area of each planar portion is set relatively small, and plural planar portions are arranged in a zigzag pattern in planar view. Note that in view of Expression (1), the edge-to-edge distance "c" may be set to be less than 0.15 times the diameter "a" of the recess.

Note that a distance $L_1$ between two opposing sides of each regular hexagon is expressed as follows:

$$L_1 = a+c \qquad \text{[Expression 3]}$$

A total distance $L_2$ of a distance between two opposing sides of the sixth regular hexagon H-6, a distance between two opposing sides of the first regular hexagon H-1, and a distance between two opposing sides of the third regular hexagon H-3, i.e., a length $L_2$ of the unit recess group G in the vehicle front-rear direction, is expressed as follows:

$$L_2 = 3L_1 = 3(a+c) \qquad \text{[Expression 4]}$$

In the above embodiment, plural recesses are provided on the floor panel main body, and ribs are provided, each connecting a pair of two adjacent recesses. Consequently, forces exerted on the floor panel main body are distributed to the plural recesses via the ribs. This makes it possible to increase rigidity compared to a different floor panel equal in plate thickness and not provided with recesses or ribs. This in turn makes it possible to inhibit deformation during manufacture and deformation when the floor panel installed in a vehicle is subjected to loads in various directions from outside the vehicle.

Also, to provide a floor panel main body having the recesses and rib with a rigidity nearly equal to that of a floor panel main body not provided with recesses or a rib, the plate thickness of the former floor panel main body can be reduced compared to that of the floor panel main body not provided with recesses or a rib. That is, installation of the recesses and ribs makes it possible to reduce weight.

In the above embodiment, each of the ribs is provided in parallel to a straight line linking a center of one of the two adjacent recesses to a center of the other. Consequently, forces exerted on the floor panel in case of a collision or the like can be distributed efficiently to the two recesses.

The rigidity of the floor panel main body can be further increased by increasing the thickness of the ribs or increasing the height of the ribs. On the other hand, there is a problem in that weight of the floor panel main body is increased. According to the above embodiment, since the thickness "w" of the ribs is less than the plate thickness "t" of the floor panel main body, and the height "h" of the ribs is less than the depth "d" of the recesses, the rigidity can be further increased while suppressing weight increases. Also, since the ribs do not protrude below the recesses, for example, when the floor panel is installed on a flat surface, the plural recesses are placed in contact with the flat surface, allowing the floor panel to be installed stably.

Also, the ribs are provided on the lower surface of the floor panel. Consequently, nothing protrudes above the upper surface of the floor panel, improving the appearance of the upper surface.

Since each of the recesses is circular in planar view and arc-shaped in longitudinal section, concentration of forces on a specific part of the recess can be inhibited.

Plural unit recess groups, each of which is made up of seven recesses, are arranged on the floor panel main body along at least one of the vehicle front-rear direction and vehicle width direction. This makes it possible to improve rigidity of the entire floor panel and further inhibit deformation of the floor panel caused by loads from outside the vehicle.

Also, six ribs are provided radially from the first recess 23-1 located at a center of the unit recess group G. In this way, by connecting plural ribs to a single recess, forces can be distributed more efficiently.

Six recesses, namely the second recess 23-2 to the seventh recess 23-7, are arranged at predetermined intervals along a circumferential direction. Thus, plural planar portions are arranged in a zigzag pattern in planar view. This makes it possible to inhibit stress concentration on specific areas of the planar portions.

[Prototype Examples]

A prototype Ref1 of the floor panel main body 2 provided with recesses and ribs was created, and prototype Ref0 provided only with recesses, but not with ribs, was created for comparison. Details thereof are shown in Table 1. Prototypes Ref1 and Ref0 were rectangular in shape and equal in length, width, and plate thickness. Regarding each of Ref1 and Ref0 five unit recess groups G were arranged in the width direction, and twelve unit recess groups G were arranged in the length direction. Also, the prototypes were equal in recess radius, recess depth, and edge-to-edge distance, respectively.

[Table 1]

The weights of the two prototypes were measured, and Ref1 was greater in weight than Ref0.

Figure 5:
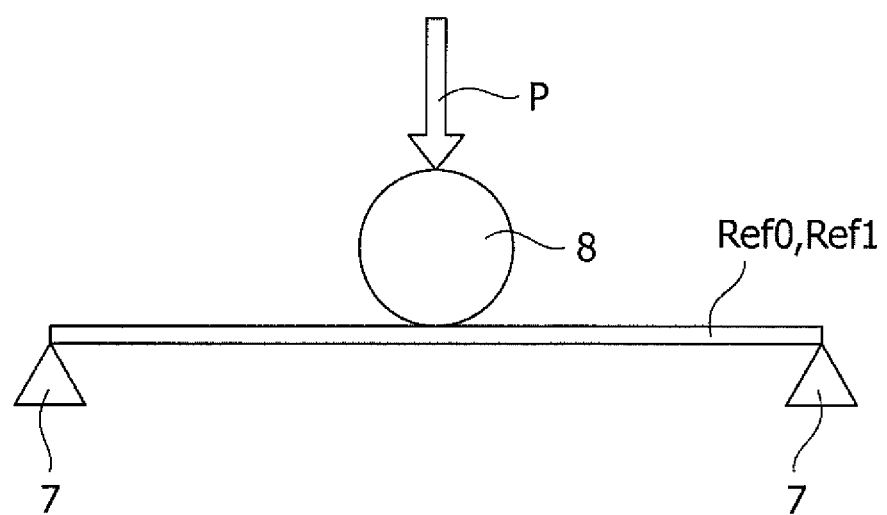
FIG. 5 is an explanatory diagram showing a method for measuring rigidity of the vehicle floor panel.

Furthermore, rigidity of Ref1 and Ref0 were measured. Specifically, as shown in FIG. 5, each of Ref1 and Ref0 was fixed at ends to a fixing member 7 so as not to be displaced in the horizontal direction. Then, a load of 100 N was applied to each of Ref1 and Ref0 in the direction of arrow P using an indenter 8 with a diameter of 100 mm, and deflection by three-point bending was estimated.

As shown in Table 1, whereas the deflection of Ref0 was 53 mm, the deflection of Ref1 was 40 mm. Regarding the deflection value divided by weight, the ratio between Ref0 and Ref1 was 1.00:0.72. That is, Ref1 was higher in rigidity than Ref0.

Other Embodiments

In the above embodiment, a total of 12 ribs are provided in the unit recess group G, but this is not so limited, and it is sufficient to provide at least one rib. That is, it is sufficient, for at least a pair of two adjacent recesses in the unit recess group G, that the two recesses be connected by a rib.

Also, plural ribs may be provided between two adjacent recesses. Each of the plural ribs can be provided in parallel to a straight line linking the center of the planar circle formed by the edge portion of one of two recesses to the center of the planar circle formed by the edge portion of the other recess. Consequently, forces exerted on the floor panel main body can be distributed more efficiently via the plural ribs.

When plural unit recess groups G are provided, if a recess belonging to a certain unit recess group and a recess belonging to another unit recess group are located next to each other, one or more ribs connecting the two recesses may be provided.

When the diameter "a" of the recesses is relatively small, because the edge-to-edge distance "c" is also small in view of Expression (1), the number of recesses per unit area in the floor panel main body increases. Consequently, the increase in the number of ribs may improve the rigidity of the floor panel main body, but the weight of the floor panel main body increases as well. Also, from the viewpoint of manufacturing, there are many things to consider, including the need to form a large number of small recesses and ribs on the floor panel main body and the need to prevent undercuts from being formed in the recesses, and therefore, floor panel design becomes complicated. Thus, if the diameter "a" of the recesses is set equal to or greater than twice the depth "d" of

TABLE 1

Shapes and measurement results of prototypes

| | | Ref0 (no rib) | Ref1 (with ribs) |
|---|---|---|---|
| Shape | Plate length (unit: mm) | 1000 | 1000 |
| | Plate width (unit: mm) | 350 | 350 |
| | Plate thickness (t) (unit: mm) | 3 | 3 |
| | Rib thickness (w) (unit: mm) | 0 | 2 |
| | Recess radius (a/2) (unit: mm) | 33 | 33 |
| | Recess depth (d) (unit: mm) | 9 | 9 |
| | Edge-to-edge distance (c) (unit: mm) | 9 | 9 |
| | Rib height (h) (unit: mm) | 0 | 5 |
| Measurement results | Weight in terms of ratio to Ref0 | 1.00 | 1.03 |
| | Deflection (unit: mm) | 53 | 40 |
| | Deflection divided by weight in terms of ratio to Ref0 | 1 | 0.72 | the recesses, the floor panel design can be made relatively easily. At the same time, increases in the weight of the floor panel can be suppressed.

Regarding the fiber used for the fiber-reinforced resin, various types of fiber are available, including carbon fiber, glass fiber, polyamide fiber, and polyethylene fiber.

Also, fiber-reinforced resins include continuous fiber-reinforced resins and discontinuous fiber-reinforced resins. The continuous fiber-reinforced resin is obtained, for example, by arranging continuous carbon fibers in one direction and impregnating the carbon fibers with a resin. The continuous fiber-reinforced resin has strong mechanical properties (rigidity and the like) in a direction in which the carbon fibers are oriented, but has weak mechanical properties in a direction orthogonal to the direction in which the carbon fibers are oriented.

The discontinuous fiber-reinforced resin is obtained, for example, by impregnating discontinuous fibers having some length with a resin. Such a discontinuous fiber-reinforced resin varies in the orientation direction of carbon fibers from fiber to fiber, and thus, the strength and weakness of mechanical properties does not have an orientation. Also, the discontinuous fiber-reinforced resin is easier to form than the continuous fiber-reinforced resin. On the other hand, fiber content may become uneven among different locations, and consequently thermal characteristics such as thermal diffusivity and a heat transfer coefficient may vary with the location, creating a higher risk of deformation during manufacture than in the case of the fiber-reinforced resin.

In view of the above circumstances, by using a discontinuous fiber-reinforced resin from among fiber-reinforced resins as a material for the floor panel main body, the floor panel can take advantage of the nature of the discontinuous fiber-reinforced resin, of which strength and weakness of mechanical properties does not have an orientation. Also, although the use of the discontinuous fiber-reinforced resin generally increases the risk of deformation during manufacture, the deformation can be inhibited if rigidity is increased by providing recesses and ribs as described above.

A peripheral wall portion 3 erected upward from an outer edge of the vehicle floor panel main body 2 can be provided and connected to side sills, a dash panel, a rear cross member, and the like. On the other hand, in the case of a frontal collision or a side collision or the like, forces may be exerted on the peripheral wall portion 3 in such a direction as to bend the peripheral wall portion 3 inward. In addition, if recesses are installed close to the peripheral wall portion 3, cracks or deformation can occur starting from the recesses, increasing the probability that the peripheral wall portion 3 will bend inward. Thus, if the recesses 23 are installed by being spaced away from the peripheral wall portion 3, even if great forces are exerted, the probability that the peripheral wall portion 3 will bend inward starting from the recesses can be reduced.

Each of the recesses may vary in diameter and depth from recess to recess. Also, the rib width and height may vary from rib to rib.

Also, the shape may vary from recess to recess. Also, the shape of the recesses is not limited to arc shapes in longitudinal section. For example, the shape formed by the planar figure, which is formed by the edge portion of each recess, in conjunction with an inner wall surface of the recess may be a conical shape, columnar shape, polygonal prism shape, polygonal pyramid shape, or the like.

Plural recesses may be provided on the floor panel main body without sticking to the unit recess group.

Since all the plural recesses provided on the floor panel main body 2 protrude from the lower surface 22, a large interior space can be secured in the vehicle. However, all the plural recesses may be shaped to protrude from the upper surface 21 and depressed on the lower surface 22. In that case, the ribs are provided on the upper surface 21.

The thickness "w" of the ribs may be set greater than the plate thickness "t" of the floor panel main body. Alternatively, the thickness "w" of the ribs may be set equal to the plate thickness "t" of the floor panel main body.

Embodiments of the present invention have been described above, but the present invention is not limited to the embodiments described above. Various modifications and changes can be made based on the technical concept of the present invention.

REFERENCE SIGNS LIST

1 Vehicle floor panel
2 Floor panel main body
21 Upper surface
22 Lower surface
23-1 to 23-7 Recess
24-1 to 24-12 Rib
25-1 to 25-4 Planar portion
3 Peripheral wall portion

The invention claimed is:

1. A vehicle floor panel comprising:
a floor panel main body made of a fiber-reinforced resin;
a plurality of recesses protruding on one of a lower surface and an upper surface of the floor panel main body and depressed on the other of the surfaces, and arranged by being spaced away from one another; and
a rib connecting two adjacent ones of the recesses on the one of the surfaces of the floor panel main body.

2. The vehicle floor panel according to claim 1, wherein the rib is provided in parallel to a straight line linking a center of one of the two adjacent recesses to a center of the other.

3. The vehicle floor panel according to claim 2, wherein a plurality of the ribs are provided in parallel to the straight line.

4. The vehicle floor panel according to claim 1, wherein a height of the rib is less than a depth of the recesses.

5. The vehicle floor panel according to claim 1, wherein the recesses are circular in planar view and arc-shaped in longitudinal section.

6. The vehicle floor panel according to claim 1, wherein a plurality of unit recess groups are arranged on the floor panel main body along at least one of a vehicle front-rear direction and a vehicle width direction, where each of the unit recess groups is made up of one recess and six recesses provided adjacent to the recess and surrounding the recess.

7. The vehicle floor panel according to claim 6, wherein the six recesses are arranged at predetermined intervals along a circumferential direction.

8. The vehicle floor panel according to claim 1, wherein the fiber-reinforced resin is a discontinuous fiber-reinforced resin.

9. The vehicle floor panel according to claim 1, further comprising a peripheral wall portion erected upward from an outer edge of the vehicle floor panel main body, wherein the recesses are provided by being spaced away from the peripheral wall portion.

* * * * *